(12) United States Patent
Bergman

(10) Patent No.: US 7,649,043 B2
(45) Date of Patent: Jan. 19, 2010

(54) BARRIER LAYER FOR ELASTOMERIC ARTICLES

(75) Inventor: Brian R. Bergman, Greer, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/710,126

(22) Filed: Feb. 23, 2007

(65) Prior Publication Data

US 2007/0161735 A1 Jul. 12, 2007

Related U.S. Application Data

(63) Continuation of application No. PCT/US2005/038351, filed on Oct. 24, 2005.

(51) Int. Cl.
*C08K 5/01* (2006.01)

(52) U.S. Cl. ............ 524/445; 524/474; 524/490; 152/510

(58) Field of Classification Search ............ 524/445, 524/474, 490; 152/510
See application file for complete search history.

(56) References Cited

U.S. PATENT DOCUMENTS

| 5,576,372 | A | 11/1996 | Kresge et al. |
| 5,631,316 | A | 5/1997 | Costemalle et al. |
| 6,598,645 | B1 | 7/2003 | Larson |
| 2005/0209413 | A1 | 9/2005 | Labauze et al. |
| 2008/0021149 | A1* | 1/2008 | Jones et al. ............ 524/547 |

FOREIGN PATENT DOCUMENTS

| EP | 0899297 A2 | 3/1999 |
| RU | 2124534 | 1/1999 |
| WO | WO 02/48257 A2 | 6/2002 |
| WO | WO 03/002682 A1 | 1/2003 |

OTHER PUBLICATIONS

International Search Report, PCT/US2005/038351, May 5, 2006.
European Search Report dated Apr. 15, 2009, Application No. 05812033.8-1214 / 1809693-PCT/US2005/038351.

* cited by examiner

*Primary Examiner*—Peter D Mulcahy
(74) *Attorney, Agent, or Firm*—Frank J Campigotto; Kurt J Fugman; E. Martin Remick

(57) ABSTRACT

A composition well suited to forming gas barrier layers in elastomeric articles is described. The barrier layer may be incorporated into, for instance, inflatable articles that are intended to contain a gas, such as air, under pressure. For example, in one embodiment, the barrier layer may be incorporated into a tire for preventing oxygen or other gaseous components from migrating through the tire. In general, the barrier layer is made from an elastomer that is combined with permeability reducing particles, such as a silicate, and a terpene hydrocarbon resin having a relatively high glass transition temperature. The terpene hydrocarbon resin can improve the processability of the composition and, in one embodiment, can even serve to improve the permeability characteristics of the barrier layer.

26 Claims, 1 Drawing Sheet

BARRIER LAYER FOR ELASTOMERIC ARTICLES

This application is a continuation of and claims the benefit of International Application No. PCT/US2005/038,351, filed Oct. 24, 2005, which claimed the benefit of International Application No. PCT/US2004/035,353, filed Oct. 22, 2004.

BACKGROUND OF THE INVENTION

1. Field of the Invention

This invention relates generally to elastomers and more specifically, to elastomers useful for inner liners of pneumatic tires.

2. Description of the Related Art

Various articles are constructed to hold a gas, such as air, under pressure. These articles include, for instance, tires, athletic balls such as basketballs, footballs, etc., inflatable boats, air mattresses, and the like. These articles are typically made from a polymeric material having some elastic properties. Tires, for instance, are typically made from an elastomeric rubber material, such as a styrene butadiene polymer.

Many elastomeric materials that are used to make inflatable articles may, in some circumstances, remain slightly permeable to gases such as oxygen. If left unchecked, the gas permeability of the inflated article may compromise the performance of the article and cause the article to deflate over time. Further, oxygen passing through the article can cause oxidation of the elastomers, causing deleterious effects to the properties of the elastomer. For instance, the elastomers may tend to harden and degrade.

In view of the above, inflatable articles, such as tires, typically contain an inner liner that is intended to reduce gas permeability and inhibit oxygen travel through the article. For instance, in the past, these inner liners have been made from a composition containing butyl rubber. Butyl rubber in its raw state, however, still remains somewhat gas permeable. Thus, many attempts have been made to combine butyl rubber with other materials in order to further reduce permeability. For example, attempts to improve the gas permeability of butyl rubber have involved adding a filler to the rubber material.

Unfortunately, great amounts of fillers need to be added to butyl rubber in order to more than minimally improve the gas permeability of the material. Adding relatively large amounts of fillers, however, may adversely affect the mechanical properties of the rubber. For instance, the rubber material may tend to be too brittle, non-flexible, and have reduced cohesion. The above effects not only adversely affect the performance of the liner material, but also make it very difficult to process the material.

In order to improve the mechanical properties of a butyl rubber and filler mixture, attempts have been made to add a plasticizer to the formulation. Plasticizers, such as oils and waxes, however, typically adversely affect the permeability properties of the rubber composition reversing the effects of adding any fillers.

As such, a need currently exists for an improved composition that may act as a barrier layer in inflatable articles, such as tires. More particularly, a need exists for a rubber composition that may be used as a barrier layer that not only has relatively low gas permeability, but that can also be easily processed by having a relatively low modulus and viscosity.

SUMMARY OF THE INVENTION

The present invention is generally directed to a composition suitable for forming a gas barrier layer in elastomeric articles. For instance, in one embodiment, the elastomeric article may be an inflated article, such as a tire, containing the barrier layer. The barrier layer which may form, for example, an inner lining in the inflated article inhibits gases, such as oxygen, from flowing through the walls of the article. Lowering the gas permeability not only improves the performance of the article but also protects the article against oxidation.

In one embodiment, for instance, the composition comprises a mixture of at least one elastomer, permeability reducing particles, and a resin comprising a terpene having a relatively high glass transition temperature. The permeability reducing particles may be dispersed throughout the elastomeric matrix. The terpene resin has a glass transition temperature of greater than about 50° C., and a softening point of less than about 170° C. The terpene resin may be added to the composition in an unmodified state. Examples of terpene resins that may be used in the present invention include polylimonene, poly(alpha or beta)pinene, or mixtures thereof.

According to the present invention, the resin is added in an amount sufficient to increase the processability of the composition. In particular, the resin may lower the modulus and the viscosity of the composition for more easily forming the composition into films for use as barrier layers in elastomeric articles. Of particular advantage, in some embodiments, the resin may also serve to further reduce the gas permeability, such as the oxygen permeability, of the composition when formed into a barrier layer.

The terpene hydrocarbon resin may be, for instance, an aliphatic, a cyclic or an aromatic resin. For instance, the terpene resin may be present in the composition in an amount from about 1 to about 50 phr. For example, in one embodiment, the terpene resin may be present in the composition in an amount from about 5 to about 20 phr.

The one or more elastomers that are combined with the terpene hydrocarbon resin can include any suitable elastomer or elastomer blend that can provide lower permeability benefits when incorporated into an elastomeric article. The elastomer may be, for instance, a natural rubber, an isoprene rubber, or a dienic rubber, such as a styrene butadiene rubber. The elastomer can also comprise a butylene polymer or copolymer alone or in combination with a dienic rubber. In one particular embodiment, for instance, the elastomer comprises a halogenated butylene polymer or copolymer. In this embodiment, for instance, the elastomer may comprise a brominated polyisobutylene or a brominated isobutylene methyl styrene copolymer.

As described above, in addition to the elastomer and the hydrocarbon resin, the composition may further include permeability reducing particles that are dispersed throughout the elastomeric matrix. The particles are present in the composition and have a size sufficient to reduce the gas permeability. The permeability reducing particles may be, for instance, a mineral-based filler, such as a phyllosilicate. For instance, in one embodiment, the particles comprise an organo modified phyllosilicate, such as a phyllosilicate modified by a surfactant. For example, in one particular embodiment, the particles comprise a phyllosilicate reacted with a quaternary ammonium surfactant. In an alternative embodiment, the phyllosilicate may be modified by a silane.

The permeability reducing particles may be present in the composition in various different amounts depending upon the particular application. For instance, in one embodiment, the particles may be present in the composition in an amount from about 1 to about 25 phr, such as from about 5 to about 20 phr. In an alternative embodiment, the particles may be present in the composition in an amount from about 3 to about 15 phr.

The composition as described above may be formed into a film in order to create a barrier layer in an elastomeric article. In one embodiment, the elastomeric article comprises a tire. The tire, for instance, may include a carcass defining an exterior side and an interior side. The carcass may have a generally unshaped cross section.

In accordance with the present invention, a barrier layer is associated with the carcass. The barrier layer comprises an elastomer, permeability reducing particles and a hydrocarbon resin as described above. The barrier layer may form an inner lining laying adjacent to the interior side of the carcass. In other embodiments, however, the barrier layer may comprise a middle layer contained within the carcass. When present in a tire, the thickness of the barrier layer may vary dramatically depending upon the particular tire being constructed.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF PARTICULAR EMBODIMENTS

Figure 1:
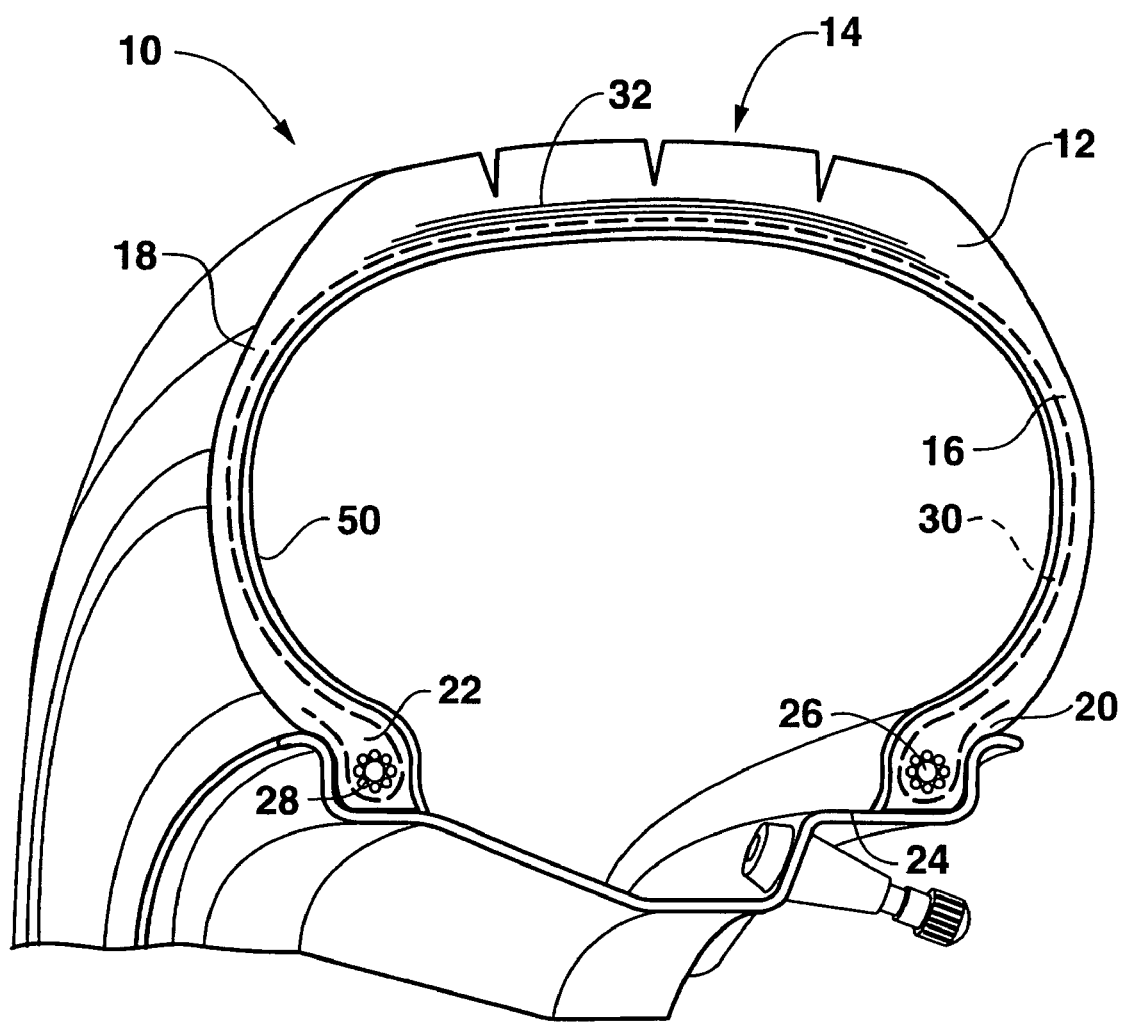
FIG. 1 is a cross sectional view of one embodiment of a tire incorporating a barrier layer made according to the present invention.

It is to be understood by one of ordinary skill in the art that the present discussion is a description of exemplary embodiments only, and is not intended as limiting the broader aspects of the present invention.

In general, the present invention is directed to a composition well suited to forming a barrier layer in an elastomeric article, such as an inflatable article that is intended to hold a pressurized gas, such as air. Barrier layers made according to the present invention may be incorporated into, for instance, tires, sports equipment, such as sport balls, and in other articles in which an internal air pressure must be maintained. When incorporated into the wall of an elastomeric article, the barrier layer of the present invention reduces the gas, vapor, and/or chemical permeability of the article. When incorporated into an inflatable article, the barrier layer not only improves the performance of the article by inhibiting gases from leaking out of the article, but also serves to protect the article from, for instance, oxidation due to oxygen migration. In the description of the invention and examples disclosed herein, a reference to improvements or reduction in permeability means a lowering of the leak rate of gas, vapor, and/or chemicals from the article.

The composition that is used to form the barrier layer of the present invention generally contains an elastomer or a blend of elastomers combined with permeability reducing particles such as a silicate and a terpene hydrocarbon resin having a relatively high glass transition temperature. The particles dispersed within the elastomer are present in order to reduce the gas permeability characteristics of the material. The terpene hydrocarbon resin having a relatively high glass transition temperature, on the other hand, is present for various different reasons. For example, in one embodiment, the terpene resin improves the dispersability of the permeability reducing particles. The terpene resin may also serve to improve the processability of the composition by lowering the modulus and the viscosity of the composition. In this manner, the composition may be more easily handled and processed for forming the composition into a film. Unexpectedly, the present inventor also found that, in some embodiments, the terpene resin actually serves to further reduce the gas permeability of the material.

The terpene resin may be unmodified and may include, for instance, polylimonene, polyalphapinene, polybetapinene, or mixtures thereof. The terpene resin may have a relatively low molecular weight, such as less than about 2000. As described above, terpene hydrocarbon resins for use in the present invention generally have a relatively high glass transition temperature. For instance, the glass transition temperature of the terpene hydrocarbon resin is greater than about 50° C., and may be greater than about 60° C., or even greater than about 70° C. The terpene resin should further have a softening point that is compatible with the processing of the other materials contained in the composition. For example, when forming a barrier layer, the terpene resin is mixed, heated, and melted with the other components in the composition. Thus, the terpene resin should have a softening point that is less than the temperature at which other ingredients in the composition, such as the elastomer, begin to degrade and break down. When the elastomer combined with the terpene resin is a butyl rubber, for instance, it is advantageous for the terpene resin to have a softening point of less than about 170° C., such as less than about 140° C. In other applications, however, the softening point of the terpene resin may be higher than the above temperatures. As used herein, the softening point is determined by the "Ring and Ball" method such as described in ASTM E-28.

Commercially available terpene resins that may be used in the present invention include a polyalphapinene resin marketed under the name Resin R2495 by Hercules Inc. of Wilmington, Del. Resin R2495 has a molecular weight of about 932, a softening point of about 135° C. and a glass transition temperature of about 91° C. Another commercially available product that may be used in the present invention includes DERCOLYTE L120 polylimonene resin sold by the Neville Chemical Company of Pittsburgh, Pa. DERCOLYTE L120 polylimonene resin has a molecular weight of about 877, has a softening point of about 119° C., and has a glass transition temperature of about 73° C. Still another commercially available terpene resin that may be used in the present invention includes SYLVARES 7125 polylimonene resin sold by the Arizona Chemical Company of Jacksonville, Fla. SYLVARES 7125 polylimonene resin has a molecular weight of about 102, has a softening point of about 125° C., and has a glass transition temperature of about 73° C.

The amount of terpene resin present in the composition depends upon the particular circumstances and the desired result. In general, for instance, the terpene resin may be present in the composition in an amount from about 1 to about 50 phr, such as from about 1 to about 35 phr. For instance, in one embodiment, the resin may be present in the composition in an amount from about 5 phr to about 20 phr.

The elastomer combined with the terpene resin may comprise any suitable rubber-like material that has desired permeability characteristics. The elastomer may be, for instance, a natural rubber, a butyl rubber, or a diene rubber such as an isoprene rubber. In one embodiment, blends of elastomers, such as a diene rubber and a butyl rubber may be used.

In one embodiment, for instance, the elastomer may comprise a vinyl-based polymer. For example, in one embodiment, the elastomer may be a polymer represented by the following general formula:

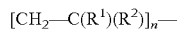

wherein $R^1$ and $R^2$ are independently hydrogen, an alkyl group, an aryl group, or an allyl group and wherein R1 and R2 may be the same or different.

The monomer-used to form the above polymer may include, but is not limited to, ethylene, propylene, butadiene, isoprene, chloroprene, vinyl chloride, vinylidene chloride, vinyl fluoride, vinylidene fluoride, styrene, and alpha-methylstyrene.

In certain embodiments, the elastomer may have a polar functionality. For example, in one embodiment, the elastomer may be halogenated and may contain a halogen functional group such as bromine, chlorine, or fluorine.

For some applications, the elastomer comprises a diene rubber. "Diene" elastomer or rubber is understood to mean, in known manner, an elastomer resulting at least in part (i.e. a homopolymer or a copolymer) from diene monomers (monomers bearing two double carbon-carbon bonds, whether conjugated or not).

In general, "essentially unsaturated" diene elastomer is understood here to mean a diene elastomer resulting at least in part from conjugated diene monomers, having a content of members or units of diene origin (conjugated dienes) which is greater than 15% (mol %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the following are understood more particularly to be meant by diene elastomer capable of being used in the compositions according to the invention:

- any homopolymer obtained by polymerisation of a conjugated diene monomer having 4 to 12 carbon atoms;
- any copolymer obtained by copolymerization of one or more dienes conjugated together or with one or more vinyl aromatic compounds having 8 to 20 carbon atoms;
- a ternary copolymer obtained by copolymerization of ethylene, of an α-olefin having 3 to 6 carbon atoms with a non-conjugated diene monomer having 6 to 12 carbon atoms, such as, for example, the elastomers obtained from ethylene, from propylene with a non-conjugated diene monomer of the aforementioned type, such as in particular 1,4-hexadiene, ethylidene norbornene or dicyclopentadiene;
- a copolymer of isobutene and isoprene (butyl rubber), and also the halogenated, in particular chlorinated or brominated, versions of this type of copolymer.

Suitable conjugated dienes are, in particular, 1,3-butadiene, 2-methyl-1,3-butadiene, 2,3-di(C1-C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene. Suitable vinyl aromatic compounds are, for example, styrene, ortho-, meta- and para-methylstyrene, the commercial mixture "vinyltoluene", para-tert.-butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers may have any microstructure, which is a function of the polymerisation conditions used, in particular of the presence or absence of a modifying and/or randomizing agent and the quantities of modifying and/or randomizing agent used. The elastomers may for example be block, statistical, sequential or microsequential elastomers, and may be prepared in dispersion or in solution; they may be coupled and/or starred or alternatively functionalized with a coupling and/or starring or functionalizing agent.

Polybutadienes (BR) are suitable, and in particular those having a content of 1,2-units of between 4% and 80%, or those having a cis-1,4 content of more than 80%, polyisoprenes, butadiene-styrene copolymers, and in particular those having a styrene content of between 5% and 50% by weight and, more particularly, between 20% and 40%, a content of 1,2-bonds of the butadiene part of between 4% and 65%, and a content of trans-1,4 bonds of between 20% and 80%, butadiene-isoprene copolymers and in particular those having an isoprene content of between 5% and 90% by weight and a glass transition temperature ("Tg" measured according to ASTM D3418-82) of −40° C. to −80° C., isoprene-styrene copolymers and in particular those having a styrene content of between 5% and 50% by weight and a Tg of between −25° C. and −50° C.

In the case of butadiene-styrene-isoprene copolymers, those which are suitable are in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene part of between 4% and 85%, a content of trans-1,4 units of the butadiene part of between 6% and 80%, a content of 1,2- plus 3,4-units of the isoprene part of between 5% and 70%, and a content of trans-1,4 units of the isoprene part of between 10% and 50%, and more generally any butadiene-styrene-isoprene copolymer having a Tg of between −10° C. and −70° C.

In summary, the diene elastomer may be selected from the group of highly unsaturated diene elastomers which comprises polybutadienes (BR), polyisoprenes (IR), natural rubber (NR), butadiene copolymers, isoprene copolymers, and mixtures of these elastomers.

Such copolymers are selected from the group which comprises styrene-butadiene copolymers (SBR), butadiene-isoprene copolymers (BIR), isoprene-styrene copolymers (SIR) and isoprene-butadiene-styrene copolymers (SBIR).

In one particular embodiment, the elastomer comprises a styrene-butadiene rubber (SBR). The SBR may have a vinyl content of from about 11 to about 63% by weight. The glass transition temperature of SBR elastomers can range from about −10° C. to about −70° C.

In another particular embodiment, the elastomer comprises a butyl rubber either alone or combined with a diene rubber. The butyl rubber may be a butylene polymer or copolymer. For instance, the butylene may be a copolymer of isobutylene and isoprene (IIR). The butyl rubber may also be halogenated as described above. For example, the butyl rubber may be brominated or chlorinated. Examples of butyl rubbers that may be used in the present invention include brominated polyisobutylene isoprene copolymers (BIIR) or brominated isobutylene methyl styrene copolymers (BIMS). One commercially available BIMS elastomer that may be used in accordance with the present invention is EXXPRO available from the Exxon Corporation. Other commercially available butyl rubbers are available from the Bayer Chemical Corporation.

The permeability reducing particles combined with the elastomer and the terpene hydrocarbon resin may comprise generally any mineral-based filler that is capable of reducing the gas permeability characteristics of a film or layer formed from the composition, thanks to its form, size or shape factor, generally known as "platy filler" (i.e., under the form of plates, platelets, layers, stacked layers or platelets, etc). Examples of fillers that may be used in order to reduce the gas permeability of the barrier layer include silicates, such as phyllosilicates. Such materials include, for instance, smectite clay minerals and various other clay materials. Particular examples include kaolin, montmorillonite such as sodium montmorillonite, magnesium montmorillonite, and calcium montmorillonite, nontronite, beidellite, volkonskoite, hectorite, laponite, sauconite, sobockite, stevensite, svinfordite, vermiculite, mica, bentonite, sepeolite, saponite, and the like. Other materials that may be used include micaceous minerals such as illite and mixed layered illite/smectite minerals, such as ledikite and admixtures of illites and the clay minerals described above.

In one embodiment, an organo modified filler may be used. For instance, an organo modified phyllosilicate may be incorporated into the composition of the present invention. In one particular embodiment, the organic structure to which the filler is associated is a surfactant. The surfactant, for instance, may be represented by the following formula:

$$-M^+R^1R^2R^3-$$

wherein M denotes nitrogen, sulfur, phosphorous or pyridinium, and $R^1$, $R^2$ and $R^3$ independently denote hydrogen atoms, alkyl groups, aryl groups, or allyl groups, which may be the same or different.

In one particular embodiment of the present invention, for instance, an organic modified montmorillonite based clay may be used. The montmorillonite clay may be organically modified with a surfactant, for instance, dimethyl-dihydrogenated tallow-quaternary ammonium salt. An organically modified montmorillonite based clay as described above is commercially available from Southern Clay Products under the trade names CLOISITE 6A, 15A, and 20A. CLOISITE 6A, for instance, contains 140 meq/100 g clay of dimethyl dihydrogenated tallow quaternary ammonium salts. In addition to dimethyl-dihydrogenated tallow-quaternary ammonium salts, in other embodiments, the clay may also be organically modified with an octadecylamine or a methyl-tallow-bis-2-hydroxyethyl quaternary ammonium salt. Still other surfactants that may be used to modify the particles include dimethyl ditallow ammonium, dipolyoxyethylene alkyl methyl ammonium, trioctyl methyl ammonium, polyoxypropylene methyl diethyl ammonium, dimethyl benzyl hydrogenated tallow quaternary ammonium, dimethyl hydrogenated tallow 2-ethylhexyl quaternary ammonium, methyl dihydrogenated tallow ammonium, and the like. In addition to surfactant modification, the edges of montmorillonite clays may also be silane modified. For example, permeability reducing particles edge treated with silane agents are available under the trade name Nanomer I.31PS from Nanocor, Inc. of Arlington Heights, Ill.

In addition to montmorillonite based clays, the permeability reducing particles may comprise a synthetic mica (synthetic or natural), vermiculite, and bentonite based clay. Synthetic micas are commercially available from Co-Op Chemical Co., Ltd. under the trade name SOMASIF. Bentonite based clays are commercially available from Elementis Specialties/Rheox, Inc. under the trade name BENTONE.

The amount of the permeability reducing particles present in the composition depends generally on the particular particles selected and the materials they are being mixed with. In general, the permeability reducing particles may be present in the composition in an amount from about 1 to about 25 phr, such as from about 5 to about 20 phr. In an alternative embodiment, the particles may be present in the composition in an amount from about 3 to about 15 phr.

In addition to the elastomer, the permeability reducing particles, and the terpene resin, the composition of the present invention can contain various other materials, such as antioxidants, accelerators, and processing aids. Further, various other fillers may be incorporated into the composition, such as carbon black or silicas.

As described above, the terpene resin incorporated into the formulation provides various benefits and advantages. For instance, the resin may improve the processability of the composition as well as actually lower the gas permeability of the composition when formed into a layer or film. Of particular advantage, these benefits are realized without having to incorporate traditional plasticizers into the formulation, such as petroleum based oils. Such plasticizers have been used in the past in order to improve the processability of elastomeric materials. Such plasticizers, however, have an adverse affect on the permeability characteristics of the layer.

In order to form a barrier layer with the composition described above, the ingredients may be mixed together in a standard mixer, such as a Banbury mixer commercially available from the Farrel Corp. of Ansonia, Conn. or a Brabender mixer commercially available from C. W. Brabender Instruments Inc. of New Jersey. During the mixing process, the permeability reducing particles become intercalated and/or exfoliated in the elastomer and terpene hydrocarbon resin mixture. The exfoliation process produces a good dispersion of the particles with a high aspect ratio.

After mixing, the formulation may be formed into a layer or film by processes such as extrusion. The film or layer being formed may also be calendered to impart a preferred orientation to the exfoliated particles in the rubber. For instance, if the particles have a plate-like shape, calendering may cause the platelets to orient perpendicular to the direction of gas migration for improving the permeability characteristics of the layer.

After being formed into a film or layer or while being formed into a film or layer, the composition may then be cured in order to vulcanize the rubber. In one embodiment, the composition may be heated at about 150-160° C. for about 30 minutes and at about 16 bars pressure during the curing process. Optimum curing times were determined by a MDR rheometer.

Barrier layers made according to the present invention may be incorporated into numerous articles. For example, in one embodiment, barrier layers made according to the present invention may be incorporated into elastomeric articles that are intended to be inflated with a gas. In these applications, the barrier layer inhibits gas flow through the wall of the article. Particular examples of articles that may incorporate a barrier layer according to the present invention include sports balls such as footballs, basketballs, and the like, flotation devices such as inflatable boats, air mattresses, and the like.

In one particular embodiment, a barrier layer made according to the present invention may be incorporated into a tire. For instance, referring to FIG. 1, a cross sectional view of a tire generally 10 is shown. The tire 10 includes a carcass 12 that defines a tread 14. The carcass 12 is made from a rubber material and, as shown, has a generally u-shaped cross section. The carcass 12 includes a first side wall 16 and a second side wall 18. The side walls 16 and 18 are connected to the tread 14 on one end and terminate at an opposite end to form a first bead 20 and a second bead 22. The beads 20 and 22 are seated in a mounting rim 24.

In order to reinforce the tire 10, the carcass 12 further includes a first bead wire 26 embedded within the first bead 20 and a second bead wire 28 embedded within the second bead 22. The bead wires 26 and 28 can be made from, for instance, metallic wires or cables. A radial carcass reinforcement 30 is wrapped around and anchored by the bead wires 26 and 28. The tire 10 further includes a crown reinforcement 32 that may comprise, for instance, a plurality of belts located below the tread 14. The crown reinforcement 32 may comprise, for instance, at least two plies of metallic wires or cables parallel to one another within each ply.

In accordance with the present invention, the tire 10 further includes a barrier layer 50 that, in this embodiment, forms an inner lining around the interior surface of the tire. The barrier layer 50 is for inhibiting pressurized gases from migrating through the walls of the tire. In accordance with the present invention, the barrier layer 50 is made from a mixture of an elastomer, a terpene hydrocarbon resin having a relatively high glass transition temperature, and permeability reducing particles. When incorporated into a tire as shown in FIG. 1, the barrier layer 50 may have a thickness that varies depending upon the particular application and the type of tire being constructed. For some applications, for instance, the barrier layer may have a thickness of less than about 3 mm. For instance, the barrier layer may have a thickness of from about 0.1 mm to about 3 mm, such as from about 0.25 mm to about 1.5 mm. It should be understood, however, that in other embodiments, the barrier layer may have a thickness greater than about 3 mm.

In the embodiment shown in FIG. 1, the barrier layer 50 is positioned on the interior surface of the tire 10. It should be understood, however, that in other embodiments the barrier layer may be positioned at other locations. For example, alternatively, the barrier layer may be incorporated into the middle of the carcass of the tire 10.

In order to form the tire 10 as shown in FIG. 1, an number of conventional processes may be used. In general, the carcass 12 of the tire 10 is made by combining an elastomer, such as a styrene polybutadiene rubber, with various additives in a high shear mixer, such as a Banbury mixer. For example, in one embodiment, approximately 75 to 125 parts of rubber are combined with at least one reinforcing filler, such as carbon black and/or silica. For example, in one embodiment, from about 50 parts to about 70 parts of carbon black and silica are combined with the rubber.

In addition to the fillers, elemental sulfur and a plasticizer may be combined into the formulation. The sulfur may be present, for instance, in an amount from about 1 to about 15 parts by weight. The plasticizer, which may comprise a hydrocarbon oil, may be present in an amount from about 1 to about 20 parts by weight.

In addition to the above, various other minor ingredients may be contained in the formulation. For instance, typical rubber formulations further contain an accelerator, an antioxidant, and at least one tackifying resin.

After the above ingredients are mixed together, the composition is extruded into sheets and calendered. The sheets are then placed in a mold around various reinforcing elements for forming the tire.

The present invention may be better understood with respect to the following examples.

EXAMPLES

The following tests were conducted in order to demonstrate the benefits and advantages of barrier layers made in accordance with the present invention.

In the examples that follow, the following test methods were used to obtain the data that is presented.

Test Methods

Mooney Plasticity (ML 1+4): Mooney Plasticity is measured in accordance with ASTM Standard D1646-04. In general, the composition in an uncured state is molded in a cylindrical enclosure and heated to 100° C. After 1 minute of preheating, the rotor turns within the test sample at 2 rpm, and the torque used for maintaining this movement is measured after 4 minutes of rotation. The Mooney Plasticity is expressed in "Mooney units" (MU, with 1 MU=0.83 Newton-meter).

Modulus @10%: Tensile modulus at 10% elongation (ASTM D412-98a).

Modulus @100%: Tensile modulus at 100% elongation (ASTM D412-98a).

Tensile: % elongation at break (ASTM D412-98a).

Permeability: The oxygen permeation values were measured using a MOCON OX-TRAN 2/60 permeability tester at 40° C. Cured sample disks of measured thickness (approximately 0.8-1.0 mm) were mounted on the instrument and sealed with vacuum grease. 10 psi of nitrogen was kept on one side of the disk, whereas 10 psi of oxygen was on the other side. Using a Coulox oxygen detector on the nitrogen side, the increase in oxygen concentration is monitored. The oxygen concentration on the nitrogen side to reach a constant value is recorded and used to determine the oxygen permeability.

Ingredients

The following ingredients were used in the examples that follow. In the tables that follow, Tg values were determined using standard DSC methods. Molecular weights were determined using the standard GPC methods.

TABLE 1

| Terpene Hydrocarbon Resin Specifications | | | | | |
|---|---|---|---|---|---|
| Name | Supplier | Chemistry | Mol. Wt. Mn/Mw | S.P. (° C.) | Tg (° C.) |
| Resin R2495 | Hercules | polyalpha pinene | 760/932 | 135 | 91 |
| Dercolyte L120 | Neville | polylimonene | 626/877 | 119 | 73 |
| Sylvares 7125 | Arizona | polylimonene | 618/1002 | 125 | 73 |

TABLE 2

Elastomer Specifications

| Name | Supplier | Br (wt %) | Tg (° C.) | ML (1 + 4) | Chemistry |
|---|---|---|---|---|---|
| BIMS "EXXPRO" | ExxonMobil Chemical | 1.70 | −57 | 46 | brominated isobutylene methyl styrene copolymer |
| BIIR | ExxonMobil Chemical | 2.40 | −63 | 44 | brominated polyisobutylene |
| SBR | Am. Syn. Rubber Corp. | — | −48 | 55 | Styrene butadiene rubber |

TABLE 3

Particle Specifications

| Name | Supplier | Modifier Concentration | Chemistry |
|---|---|---|---|
| Cloisite 6A | Southern Clay Products | 140 meq/ 100 g clay | montmorillonite-based clay modified with a dimethyl-dihydrogenated tallow-quaternary ammonium salt (2M2HT) |

*Data supplied by Southern Clay Products

TABLE 4

Specifications of Common Rubber Plasticizing Resins

| Name | Supplier | Chemistry | Mol. Wt. Mn/Mw | S.P. (° C.) | Tg (° C.) |
|---|---|---|---|---|---|
| Escorez 1102 | ExxonMobil | Aliphatic hydrocarbon (C10 units) | 2500/1000 | 97-99 | 37 |
| Struktol 60 NS | Struktol Corp. | Aliphatic hydrocarbon | — | 95-105 | 80 |
| TPC 150 | Texas PetroChem | Liquid Polyisobutylene | 450/500 | liquid | −101 to −105 |
| Sun Par 115 | Sun Chemical Co. | Paraffinic oil | — | liquid | −57, −34, −20 |

Example 1

In the example, the following ingredients were combined together to form a film. In one experiment, terpene resin R2495 was added, while in a control the terpene resin R2495 was not added. As shown below, in this example, the elastomer used was a brominated polyisobutylene obtained from ExxonMobil Chemical Company.

| | (phr) |
|---|---|
| Elastomer (BIIR) | 100 |
| Carbon Black (N772) | 51 |
| Tack Resin | 2.5 |
| Curatives | 5.7 |
| Organoclay (Cloisite 6A) | 4 |
| Resin R2495 | 10 |

The components were mixed in a 2 liter Banbury mixer. Elastomers were masticated with the organoclay to 70° C. at 40 RPM. The rotor speed was then increased to 60 RPM, and the carbon black, chemicals, and resins were added. The mix was finally dropped out of the mixer at 140° C. A bromobutyl cure package was added on a cool mill. Plaques were cured for mechanical properties testing using optimum cure conditions determined by a MDR rheometer at 150° C.

Resin R2495 has a relatively high softening point (135° C.). Therefore, a minimum drop temperature ≧135° C. using an inner liner mix procedure was used in order to achieve good incorporation (dispersion) of the Resin R2495.

Addition of 10 phr of Resin R2495 decreased the viscosity approximately 11.9 MU points (21.3%) in the formulations, and decreased the cured modulus @10% elongation by 0.6 Mpa (19% decrease) in the formulations. The high strain modulus @ 100% was also decreased approximately 24% in the formulations containing the Resin R2495. The tensile (percent elongation to break) properties was also improved 158% versus the mix without Resin R2495. The unexpected result of this plasticizing effect is that the oxygen permeability was not degraded. In fact, the permeability was improved by 5.7%.

A summary of the physical properties is shown in Table 5 below.

TABLE 5

| | Elastomer | |
|---|---|---|
| | BIIR | BIIR |
| Resin R2495 (phr) | — | 10 |
| ML 1 + 4 (MU) | 55.8 | 43.9 |
| Modulus 10% (MPa) | 3.2 | 2.6 |
| Modulus 100% (MPa) | 1.19 | 0.91 |
| Tensile (%) | 583 | 741 |
| Permeability (% improvement) | — | 5.7 |

Example 2

The procedures of Example 1 were substantially repeated. In this example, however, the elastomer used was a BIMS elastomer. This elastomer is marketed under the trade name "EXXPRO" obtained from the Exxon Corporation. The formulation containing the terpene resin is as follows.

|  | (phr) |
|---|---|
| Elastomer (BIMS) | 100 |
| Carbon Black (N772) | 51 |
| Tack Resin | 2.5 |
| Curatives | 5.7 |
| Organoclay (Cloisite 6A) | 4 |
| Resin R2495 | 10 |

The formulations (one containing resin R2495 and one control formulation not containing resin R2495) were mixed in accordance with the procedure outlined in Example 1.

Addition of 10 phr of Resin R2495 decreased the viscosity approximately 15.3 MU (22%) and decreased the cured modulus @10% elongation 0.6 MPa (21%). in the BIMS elastomer formulation. Additionally, the high strain modulus @ 100% was also decreased approximately 32%. The tensile elongation to break was increased 181% as a result of the resin addition. Again, the unexpected result of this plasticizing effect is that the oxygen permeability was not degraded. In fact, the permeability was improved by 4.5%

A summary of the physical properties is shown in Table 6.

TABLE 6

|  | Elastomer | |
|---|---|---|
|  | BIMS | BIMS |
| Resin R2495 (phr) |  | 10 |
| ML 1 + 4 (MU) | 70.1 | 54.8 |
| Modulus 10% (MPa) | 2.8 | 2.2 |
| Modulus 100% (MPa) | 1.33 | 0.90 |
| Tensile (%) | 572 | 753 |
| Permeability (% improvement) | — | 4.5 |

Example 3

The procedures of Example 1 were again repeated. In this example, however, a styrene butadiene rubber elastomer was used. Two compositions were formulated during this example. One formulation as described below contained terpene resin Sylvares 7215 while a control formulation did not contain the hydrocarbon resin.

|  | (phr) |
|---|---|
| Elastomer (SBR) | 100 |
| Carbon Black (N772) | 51 |
| Curatives | 3.5 |
| Organoclay (Cloisite 6A) | 5 |
| Resin Sylvares 7215 | 10 |

The compositions were mixed in a 2 liter Banbury mixer. Elastomers were masticated with the organoclay for 1 minute at 40 RPM. The rotor speed was then increased to 60 RPM, and the carbon black, chemicals, and resins were added. The mix was finally dropped out at a maximum temperature of 165° C. A cure package was added on a cool mill. Plaques were cured for mechanical properties testing using optimum cure conditions determined by a MDR rheometer at 150° C.

Addition of 10 phr of the high Tg resin Sylvares 7125 decreased the viscosity 11.6 MU (16.1%) in the SBR formulation. The addition of the resin Sylvares 7125 also decreased the modulus @10% elongation 1.0 MPa (24%). The high strain modulus @100% was also decreased 30%. The tensile elongation to break was increased 127% as a result of the resin addition. Again, the unexpected result of this plasticizing resin is that the permeability was improved 7.6%.

A summary of the physical properties is displayed in Table 7.

TABLE 7

|  | Elastomer | |
|---|---|---|
|  | SBR | SBR |
| Resin Sylvares 7125 (phr) | — | 10 |
| ML 1 + 4 (MU) | 72.1 | 60.5 |
| Modulus 10% (MPa) | 4.3 | 3.2 |
| Modulus 100% (MPa) | 1.50 | 1.05 |
| Tensile (%) | 665 | 792 |
| Permeability (% improvement) | — | 7.6% |

Examples 4-10

In the following examples, elastomer films were formed containing different plasticizers. In particular, one formulation contained no plasticizer, three formulations contained terpene resins in accordance with the present invention (Examples 4-6), and four formulations contained conventional plasticizers (Examples 7-10). The properties of the resulting films were then compared. The formulations used in these examples are as follows:

|  | (phr) |
|---|---|
| Elastomer (BIMS) | 100 |
| Carbon Black (N772) | 51 |
| Tack Resin | 2.5 |
| Curatives | 5.7 |
| Organoclay (Cloisite 6A) | 5 |
| Plasticizer | 10 |

The formulations were mixed in accordance with the procedure outlined in Example 1. Table 8 details the plasticizing effects of various hydrocarbon based resins in a BIMS formulation in comparison to the properties of formulations not containing a plasticizing resin and formulations containing conventional plasticizers. Examples 4-6 made according to the present invention contained a terpene resin, specifically a polyalphapinene resin, a polylimonene resin, and another polylimonene resin respectively. Examples 7-10 containing conventional plasticizers included aliphatic hydrocarbon resins (Examples 7 and 8), liquid polyisobutylene (Example 9), and a paraffinic oil (Example 10).

As shown in Table 8 below, the terpene resins of the present invention had strong plasticizing effects by decreasing the uncured viscosity and the cured modulus. The terpene resins also improved the permeability of the films. In Examples 7-10, however, when other plasticizers were used, the permeability of the film was significantly adversely affected in comparison to the control.

TABLE 8

| | Example | | | | | | | |
|---|---|---|---|---|---|---|---|---|
| | Control | 4 | 5 | 6 | 7 | 8 | 9 | 10 |
| Elastomer | BIMS | BIMS | BIMS | BIMS | BIMS | BIMS | BIMS | BIMS |
| Plasticizer (10 phr) | — | R2495 | Dercolyte L120 | Sylvares 7125 | Escorez 1102 | Struktol 60NS | TPC 150 | Sun Par 115 |
| ML 1 + 4 (MU) | 70 | 52 | 50 | 50 | 50 | 52 | 58 | 49 |
| Modulus 10% (MPa) | 3.3 | 2.6 | 2.7 | 2.6 | 2.7 | 2.7 | 2.5 | 2.6 |
| Modulus 100% (MPa) | 1.48 | 1.09 | 1.12 | 1.09 | 1.11 | 1.16 | 1.07 | 1.25 |
| Tensile (%) | 541 | 638 | 637 | 625 | 615 | 625 | 622 | 454 |
| Permeability (% impr) | — | 8.6 | 7.7 | 12.9 | −5.2 | −13.7 | −61 | −92 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged either in whole or in part. Furthermore, those of ordinary skill in the art will appreciate that the foregoing description is by way of example only, and is not intended to limit the invention so further described in such appended claims.

What is claimed is:

1. A composition suitable for forming a gas barrier layer, the composition comprising:
   at least one elastomer;
   permeability reducing particles dispersed in the elastomer; and
   between about 7 and about 50 phr of an unmodified terpene resin having a glass transition temperature greater than about 50° C. and a softening point of less than about 170° C. wherein the composition includes no modified terpene resin.

2. The composition of claim 1, wherein the elastomer comprises a dienic rubber.

3. The composition of claim 1, wherein the elastomer comprises a styrene butadiene rubber.

4. The composition of claim 1, wherein the elastomer comprises a butylene polymer or copolymer thereof.

5. The composition of claim 1, wherein the elastomer comprises a halogenated butylene polymer or copolymer thereof.

6. The composition of claim 1, wherein the elastomer comprises a brominated polyisobutylene or a brominated isobutylene methyl styrene copolymer.

7. The composition of claim 1, wherein the elastomer comprises a blend of a dienic rubber and a butylene polymer or copolymer thereof.

8. The composition of claim 1, wherein the elastomer comprises a blend of elastomers selected from the group consisting of dienic rubbers and butylene polymers or copolymers thereof.

9. The composition of claim 1, wherein the resin has a glass transition temperature of greater than about 70° C.

10. The composition of claim 1, wherein the resin has a softening point of less than about 140° C.

11. The composition of claim 1, wherein the resin comprises a polylimonene, poly(alpha or beta)pinene, or mixtures thereof.

12. The composition of claim 1, wherein the resin is present in the composition in an amount from about 10 to about 50 phr.

13. The composition of claim 1, wherein the permeability reducing particles comprise a mineral-based filler.

14. The composition of claim 1, wherein the permeability reducing particles comprise a phyllosilicate.

15. The composition of claim 1, wherein the permeability reducing particles comprise an organo modified phyllosilicate.

16. The composition of claim 15, wherein the phyllosilicate is modified by a surfactant.

17. The composition of claim 16, wherein the phyllosilicate comprises sodium montmorillonite and the surfactant comprises a quaternary ammonium surfactant.

18. The composition of claim 1, wherein the permeability reducing particles are present in the composition in an amount from about 1 to about 25 phr.

19. The composition of claim 1, wherein the permeability reducing particles are present in the composition in an amount from about 5 to about 20 phr.

20. The composition of claim 1, wherein the permeability reducing particles are present in the composition in an amount of from about 3 to about 15 phr.

21. The composition of claim 1, wherein the composition further comprises carbon black, a tack resin, and at least one curative.

22. A gas barrier layer well suited for inhibiting oxygen flow through an inflated article, the gas barrier layer comprising:
   the composition of claim 1.

23. The barrier layer of claim 22, wherein the elastomer comprises a butylene polymer or copolymer thereof and wherein the resin comprises a terpene having a glass transition temperature of greater than about 70° C. and a softening point of less than about 140° C., the terpene being present in an amount between about 10 and about 50 phr.

24. A tire, comprising:
   a carcass defining an exterior side and an interior side, the carcass having a generally u-shaped cross section; and
   a barrier layer associated with the carcass, the barrier layer comprising the composition of claim 1.

25. The tire of claim 24, wherein the elastomer comprises a material having the following formula:

$$-[CH_2-C(R^1)(R^2)]_n-$$

wherein $R^1$ and $R^2$ are independently hydrogen, an alkyl group, an aryl group, or an allyl group and wherein $R^1$ and $R^2$ may be the same or different.

26. The tire of claim 24, wherein the elastomer comprises a butylene polymer or copolymer thereof and wherein the resin comprises a terpene having a glass transition temperature of greater than about 70° C. and a softening point of less than about 140° C., the terpene being present in an amount between about 10 and about 50 phr.

* * * * *